United States Patent

[11] 3,614,338

[72] Inventor Peter Willibrord Bogels
Emmasingel, Eindhoven, Netherlands

[21] Appl. No. 803,255
[22] Filed Feb. 28, 1969
[45] Patented Oct. 19, 1971
[32] Priority Mar. 9, 1968
[33] Netherlands
[31] 6,803,410

[54] AIR BEARING HEAD DRUM WITH GROOVES TO GENERATE THE AIR LAYER
6 Claims, 3 Drawing Figs.

[52] U.S. Cl. 179/100.2 T, 179/100.2 P
[51] Int. Cl. G11b 5/52, G11b 15/64
[50] Field of Search 179/100.2 T, 100.2 P; 340/174.1 E

[56] References Cited

UNITED STATES PATENTS

| | | | |
|---|---|---|---|
| 3,333,753 | 8/1967 | Streets | 226/97 |
| 3,293,377 | 12/1966 | Backers et al. | 179/100.2 |
| 3,436,491 | 4/1969 | Quinn et al. | 179/100.2 |
| 3,482,232 | 12/1969 | Farrand et al. | 340/174.1 |

*Primary Examiner*—Bernard Konick
*Assistant Examiner*—Robert S. Tupper
*Attorney*—Frank R. Trifari

ABSTRACT: A tape recording and/or playback apparatus having a pair of drums acting as a guide member, arranged concentrically, one above the other, for helically guiding the tape therearound. One of the drums is rotatably mounted and is provided with circumferential grooves, which intersect the circumferential velocity vector of said drum. The grooves create an air layer between the tape and drum guide member. The rotating drum with grooves thereon, thus reduces the functional forces on the tape.

Figure 1:
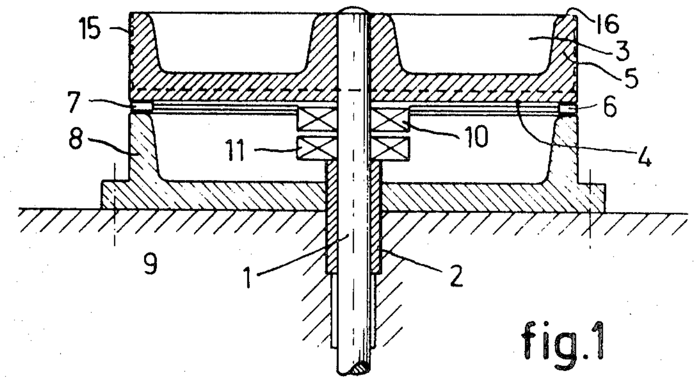

INVENTOR.
PETER W. BÖGELS

BY
[signature]
AGENT

AIR BEARING HEAD DRUM WITH GROOVES TO GENERATE THE AIR LAYER

The invention relates to an apparatus for recording and/or playing back magnetic registrations on and from a tape-shaped carrier coated with magnetizable material. The apparatus comprises two drum-shaped, concentrical guide members having substantially equal outer diameters, around which the tape carrier is helically guided. At least one of the members is rotatably arranged on the apparatus and is provided with one or more recording or playback heads. A problem encountered in such is that, carrier should lie flat on at least part of the heads at the area of the useful gap, so that there is no air layer between the head and the carrier, and on the other hand the carrier should be in uniform contact with the drum surface, so that objectionable forces on the tape carrier (usually a synthetic resin material) are avoided.

The invention provides means for meeting these requirements in a simple manner and is characterized in that in an apparatus of the kind described at least one or more rotatable, drum-shaped guide members are provided with circumferential grooves, which intersect the circumferential velocity vector of these rotatable guide members. An air layer is thereby formed between the tape-shaped carrier and the rotatable, drum-shaped guide members.

In a preferred embodiment of the invention, comprising two drums, between which a gap is provided the grooves are rectilinear in a developed view of the rotatable drum as seen in a flat plane. This arrangement facilitates the manufacture of the grooves.

In a further embodiment of the invention, the direction of the grooves, is at an arcuate angle of about 30° to the circumferential velocity vector when viewed from the gap between he drums. Practice and calculations have shown that the maximum useful effect of the grooves is obtained at this angle.

Although the direction of rotation of the drum may be chosen to be opposite to the direction of travel of the record carrier, it is desirable that the rotation of the drum and the movement of the record carrier be in the same direction so that the proper forces are exerted on the tape. When the directions are the same the stress in the record carrier will increase to a lesser extent than if the direction of travel of the record carrier where opposite to the direction of rotation of the rotating drum, or if the tape were to be guided about a stationary drum.

In a further embodiment of the invention, the circumferential speed of the rotatable drum is considerably higher than the speed of movement of the record carrier. This has the effect of further reducing the friction between the tape carrier and the drum.

The useful effect of the invention is further improved, when in a further embodiment of the invention, the grooves open out at on end thereof in the end face of the drum(s) remote from the gap and terminate at the other end thereof at a given distance from the other end face facing the gap. This facilitates the inflow of the air into the grooves, whereas outflow thereof encounters a given amount of resistance. This will help establish and maintain the air layer between the tape and the drum.

The grooves may be made in many ways, for example, by milling, grinding etching and the like. The grooves are preferable bounded by a curved surface, which has a curved line on intersection with the outer surface of the drum at the end facing the gap. This surface line is located in a flat plane at right angles to the axis of the drum. The walls of the grooves, when viewed in cross section, are normal to each other. This arrangement is of further benefit to the airflow pattern.

Figure 2:
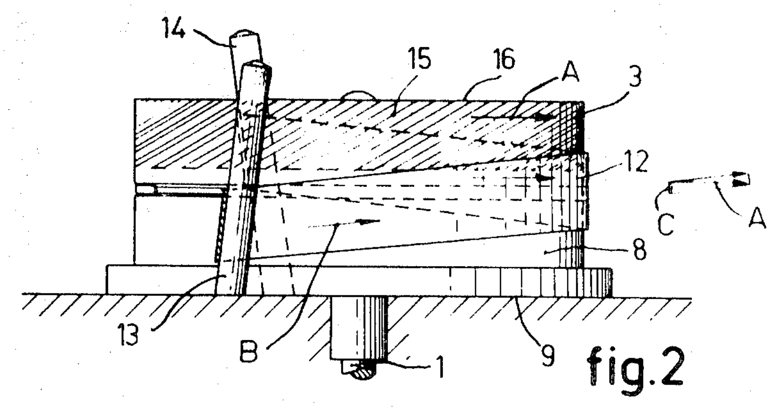
Figure 3:
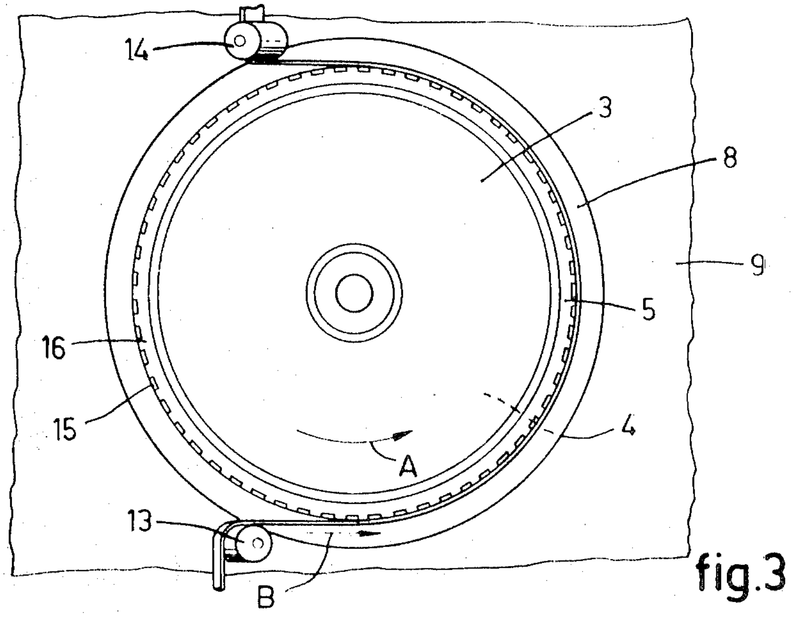

The invention will be described with reference to the drawing, which shows one embodiment of the invention and in which FIG. 1 is a sectional view of two drum-shaped guide members for a tape-shaped carrier coated with a magnetizable material, FIG. 2 is a side elevation of the embodiment of FIG. 1 and FIG. 3 is a plan view of the embodiment of FIG. 1.

In the drawing reference numeral 1 designates a vertical shaft adapted to be rotated in a bearing 2 and provided with a rotatable drum 3, comprising a hub, a bottom 4 and a rim 5. The lower side of the bottom 4 of said drum is provided with two recording and/or playback heads 6 and 7, which are especially intended for recording and/or playing back video signals on or from a carrier respectively. These heads 6 and 7 rotate with the drum 3, 4, 5. Beneath the drum 3 a stationary drum 8 is fastened to a surface 9 in the apparatus. Between the drums 3 and 8 a narrow gap is left.

A transformer comprising a portion 10 rotating with the rotatable drum and a stationary portion 11 provides the current supply to or the current outlet from the heads 6 and 7.

The rotatable drum 3, 4, 5 and the stationary drum 8 are helically surrounded by a carrier 12, coated at least on one side with a magnetizable material. The carrier is guided around the drums along two pins 13 and 14 and moves in the same direction, indicated by the arrow A and B, as the rotatable direction of rotation of the drum.

The outer wall of the rim 5 is provided with grooves 15, which are at an angle of 30° to the circumferential velocity vector of the rim 5. These grooves open out at one end thereof in the end wall 16 of the rotatable drum remote from the stationary drum and terminate at the other end thereof at a short distance from the outer wall of the bottom 4. The width of said grooves is about 1 mm; the depth is 30 to 50 $\mu$m.; the dam width between the grooves is also about 1mm. The grooves may be provided by milling, grinding, etching and similar processes.

In practice a method of machining has been found to be advantageous in which grooves are obtained, which are bounded at the end facing the gap by a curved face intersecting the outer surface of the drum along a curved line located in a flat plane at right angles to the axis of the drum, while the walls of the grooves are normal to each other when viewed in cross section.

The construction described has the advantage that the frictional forces exerted on the carrier are smaller than in the case of a stationary drum. Moreover, the tensile forces exerted in front of and after the run-in and runout points of the carrier respectively at the rotatable drum are smaller than in the case of a standstill of the drum or of a rotation in the opposite direction. By using one rotating drum and one stationary drum the forces exerted on the carrier in the area where the carrier passes along the drums are relatively compensated for the major part, so that the tensile forces in front of and after the runin and runout points respectively are substantially equal to each other. The grooves at the circumference of the rotatable drum form an air layer between the drum surface and the carrier so that the friction between this surface and the carrier is considerably reduced. Moreover, with a suitable choice of the travel of the tape along the drum so that the runin point of the record carrier on the drum-shaped guide members is located on the side of the stationary drum and the runoff point of the record carrier from said guide members is located on the side of the rotatable drum, a component C (see FIG. 2) of the force exerted on the tape is obtained in the direction towards the stationary drum. This component C may be utilized to urge the tape against laterally guiding members on the stationary drum. In a practical apparatus the circumferential speed of the rotatable drum was 8 ms./sec.; the speed of the carrier was 17 cms./sec. The first-mentioned speed depends, of course, to a high extent upon the requirements to be met by recording and playback.

What is claimed is:

1. An apparatus for recording and/or playing back magnetic registrations on or from a tape-shaped carrier coated with magnetizable material comprising a base member, a first drum-shaped guide member stationarily mounted on said base, a second drum-shaped guide member rotatably mounted above and concentric with said first drum member, said first and second drum guide members having substantially equal outer diameters and forming a gap between them, at least one magnetic recording and/or playback head mounted on said second drum-shaped guide member and located within said gap, means for helically guiding said tape carrier about the circumference of said first and second drum-shaped guide members, and a plurality of grooves located on the circumferential surface of said second drum-shaped guide member, each of said grooves extending in a direction which is at an angle of approximately 30° to a plane which is perpendicular to the axis of rotation of said rotating drum, whereby as said second drum rotates a layer of air is created between said drum surface and said tape carrier.

2. The apparatus according to claim 1 wherein the direction of rotation of said second drum-shaped guide member is the same as the direction of travel of said tape carrier.

3. The apparatus according to claim 2 wherein said grooves have a substantially rectangular cross-sectional shape and extend from the upper surface of said second drum-shaped guide member linearly to a termination point on the circumferential surface of said second drum which is spaced from the lower surface thereof.

4. The apparatus according to claim 3 wherein the speed of rotation of said second drum-shaped guide member is greater than the speed of travel of said tape carrier.

5. The apparatus according to claim 4 wherein said means for guiding said tape carrier helically about said drum guide members comprises a run-in means for introducing said tape carrier on to said drum-shaped guide members on said first drum-shaped guide member and runoff means for establishing a point of egress of said tape carrier from said second drum-shaped guide member.

6. The apparatus according to claim 5 wherein the termination points of said grooves form a curved surface which has a curved line of intersection with the outer surface of the drum-shaped guide members, said line being located in a plane oriented at 90° with respect to the axis of said drum members, and wherein each of the grooves comprise a pair of sidewalls and a backwall when viewed in a cross section said sidewalls being parallel to each other and perpendicular to the backwall.